Figure 1:
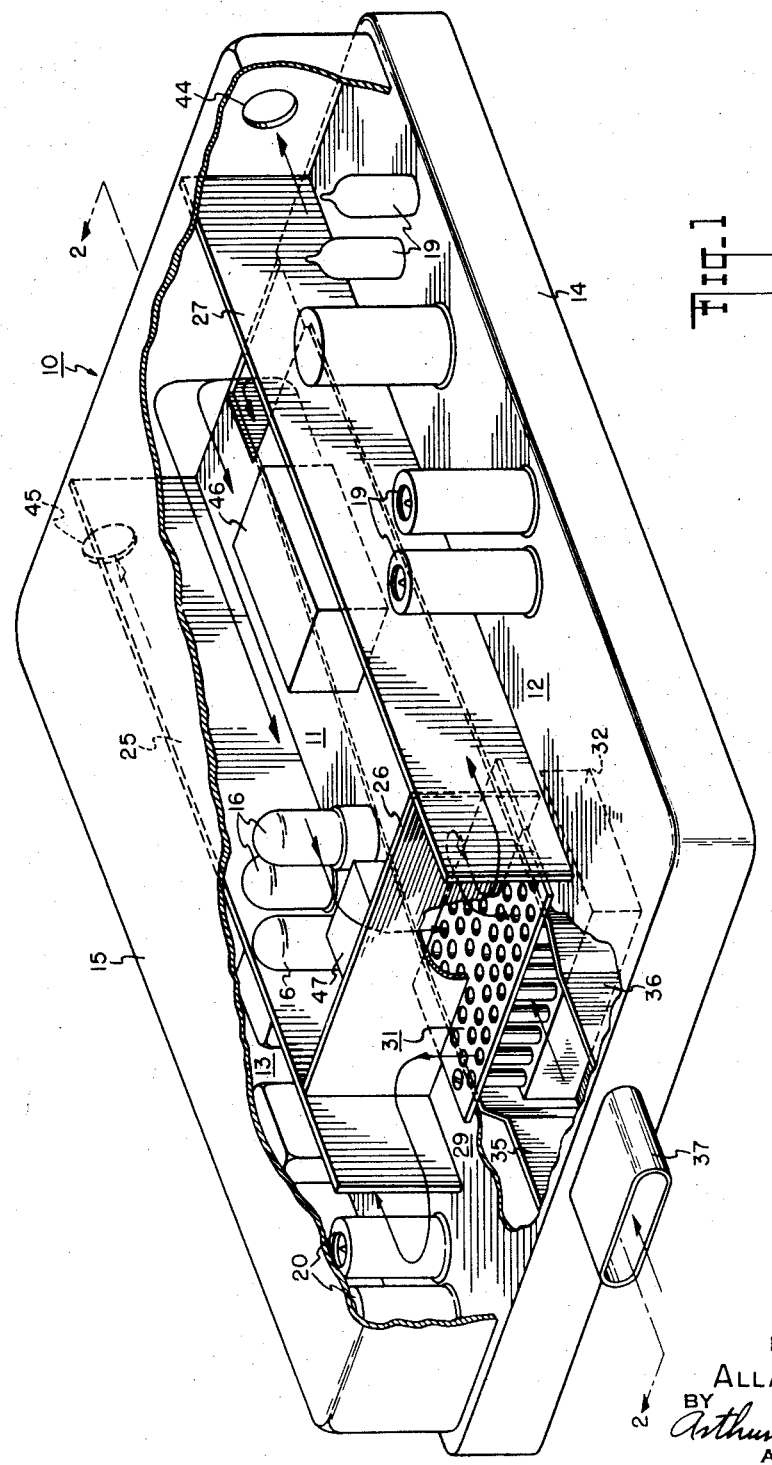

Aug. 9, 1960   A. D. KRAUS   2,948,518
FLUID CIRCULATION COOLING SYSTEMS
Filed Feb. 6, 1957   2 Sheets-Sheet 1

INVENTOR
ALLAN D. KRAUS
BY
Arthur H. Serrell
ATTORNEY

Aug. 9, 1960     A. D. KRAUS     2,948,518
FLUID CIRCULATION COOLING SYSTEMS
Filed Feb. 6, 1957     2 Sheets-Sheet 2
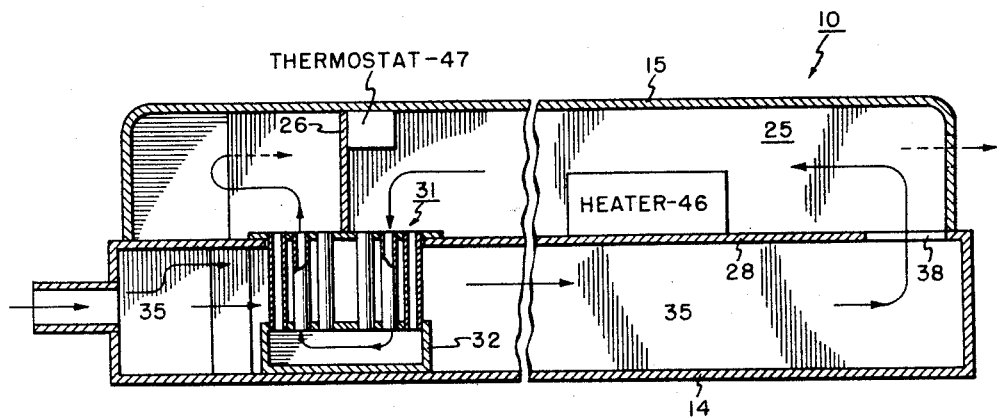
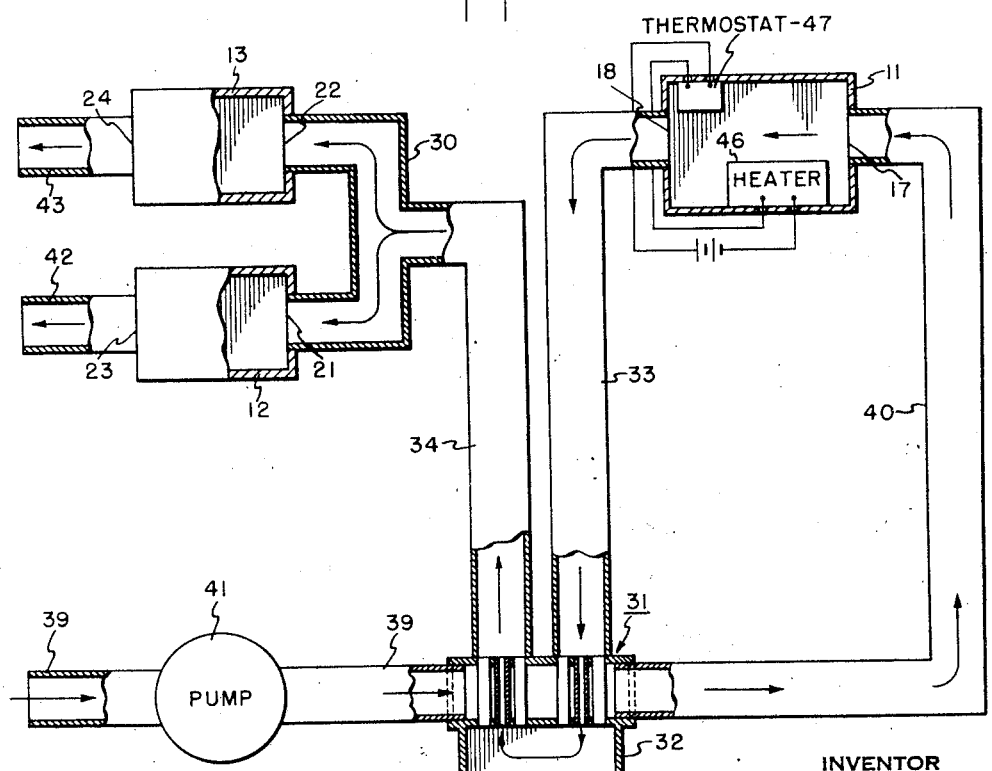
INVENTOR
ALLAN D. KRAUS
BY Arthur H. Serrell
ATTORNEY United States Patent Office 2,948,518
Patented Aug. 9, 1960

2,948,518

FLUID CIRCULATION COOLING SYSTEMS

Allan D. Kraus, Glen Cove, N.Y., assignor to Sperry Rand Corporation, a corporation of Delaware Filed Feb. 6, 1957, Ser. No. 638,533

2 Claims. (Cl. 257—313)

This invention relates to a cooling system of the character in which the temperature of a circulating fluid such as air within an enclosed area containing a primary heat radiating element therein is maintained within predetermined limits. The enclosed area may be provided by a closed assembly having one or more individual compartments each of which contains a plurality of heat radiating elements in the path of the circulating fluid. The radiating elements located in the separate compartments consist of a plurality of individual electrical components such as provide one or more amplifiers, some of whose radiating parts are shown in the drawing. While the amplifiers include many heat radiating components that may dissipate heat at different rates and be located in different positions within the compartment provided for the same, each group of such components in a single compartment may be considered a single heat radiating element for the purposes of the present application. Also, individual compartments may be provided in a single closed receptacle for each of the collectively considered heat radiating elements.

The primary object of the improved system is to maintain the circulating fluid in the area of the primary radiating element or elements in the receptacle within predetermined temperature limits to thereby provide for effective operation of the elements under optimum temperature conditions. Where the radiating elements are electrical components of a type whose characteristics change with temperature, the system is effective to maintain uniform operating characteristics.

The improved system is particularly useful in the cooling of airborne electronic equipment wherein the weight and size of the elements must necessarily be kept at a minimum. The cooling medium used in such equipment may be air at the temperature of the atmosphere in which the craft is flying. Although this cooling fluid may be at a relatively very low temperature in order to minimize the quantity of the fluid required in the system, it has been found necessary to raise the temperature of the entrant air to a value more acceptable to the proper functioning of the electrical components that provide the heat dissipating elements of the system. One of the features of the present invention is accordingly provided by the use of a light weight heat exchanger in the system that preheats the entrant cooling fluid or air in accordance with the heat supplied thereto from the fluid downstream of the primary heat radiating element. Another feature of the invention is in the incorporation in the system of a relatively small and light weight means for heating the fluid or air that is thermostatically controlled to cut in at a predetermined low point and cut off at a predetermined high point. In the improved system, both the heat exchanger and supplemental heating means and thermostatic controls of the combination cooperate to maintain the temperature of the fluid or air in the area of the heat radiating component or components within a predetermined range.

A further feature of the invention is provided by the incorporation of the individual essential elements of the improved cooling system into a relatively small, light weight, packaged assembly such as may be used on an aircraft.

Other objects, features and structural details of the invention will be apparent from the following description when read in relation to the accompanying drawings, wherein, Fig. 1 is a perspective view of a packaged assembly constructed in accordance with the present inventive concepts in which a portion of the cover is cut away to show the interior of the package, Fig. 2 is a sectional view of the unit taken on lines 2—2 of Fig. 1, and Fig. 3 is a schematic view of the improved cooling system showing the individual components thereof in unpackaged relation.

As shown in the drawing, the improved fluid circulation cooling system includes a packaged assembly 10 which may be subdivided into a plurality of compartments as indicated at 11, 12 and 13 in Fig. 1. The assembly 10 is provided by a closed hollow base 14 and a cover element 15 that is fixedly mounted thereon in any suitable manner. The base 14 provides the chassis on which amplifier components of the electrical components which provide the respective heat radiating elements are respectively attached in conventional fashion. As illustratively depicted only in Fig. 1, the electronic tubes shown therein represent the heat radiating components in the respective compartments of the assembly 10. Tubes 16 contained in the compartment 11 are located therein in the path of a fluid or airstream between inflow and outflow ends thereof as represented at 17 and 18 in Fig. 3. Tubes 19 are similarly located in the compartment 12. The tubes 20 are also located in similar fashion in the compartment 13. The inflow ends of the respective compartments 12 and 13 shown in Fig. 3 are indicated at 21 and 22. The respective outflow ends 23 and 24 of the compartments 12 and 13 are indicated in Fig. 3.

As shown in Figs. 1 and 2, the compartments provided in the assembly 10 are defined by the interior wall plates 25, 26 and 27 which are fixedly mounted in a suitable manner on the roof plate 28 of the hollow base 14. Crosswise arranged plate 26 divides the assembly lengthwise to provide an additional compartment 29 that is common to the respective compartments 12 and 13. The equivalent of this structure is indicated in Fig. 3 by the U-shaped conduit or connection 30 in which the fluid divides as represented by the arrows at this point depicting the path of the fluid or air flow in the system.

In accordance with the present inventive concepts, the entrant fluid or air is preheated by a small heat exchanger 31 in accordance with heat supplied thereto from one or more of the heat radiating components depicted herein. The exchanger 31 is accordingly located downstream of the compartment 11 within the assembly in the inflow passageway in the chassis or base 14. The heat exchanger shown is a tubular type that is mounted in the base 14 by being suitably fixed to the roof plate 28 so that the open end of half of the tubes are respectively contained in the compartments 11 and 29 as separated by the cross plate 26, Fig. 2. The closed end of the exchanger 31 is provided by a rectangularly shaped closed box 32 that facilitates fluid or air flow between the noted compartments in the direction of the arrow noted at this point in Fig. 2. This construction provides a downstream fluid connection to the outflow end of the compartment 11 of the assembly. The conduit or pipe 33 provides an equivalent arrangement in the unpackaged system shown in Fig. 3, wherein the same connects the outflow end 18 of the individual compartment 11 to the heat exchanger 31. This arrangement of elements in Figs. 1 and 2, also provides a connection from the exchanger 31 to the common inflow compartment 29 to the adjacent compartments 12 and 13. A single instead of a dual arrangement of compartments or receptacles may be provided in this regard wherein the same receives fluid at the inflow end 21 or 22 thereof from the exchanger 31 by way of a conduit or pipe 34 as shown in Fig. 3. The exchanger 31 of the assembly connects the outflow end of the compartment 11 to the inflow end of the compartment 29 which is common to the parallel compartments 12, 13.

The upstream fluid connection provided to compartment 11 is shown in Figs. 1 and 2 as a passageway in the base 14 defined by side walls 35 and 36 which extend lengthwise of the receptacle below the roof plate 28 defining the bottom wall of the compartments 29 and 11. Fluid is supplied to the passageway by way of a suitable hose or supply conduit (not shown) that fits in the connector 37 located on the base 14. The exchanger 31 is located in the upstream passageway, the fluid or air flowing around the vertically disposed exchanger tubes in the movement thereof along the passageway as indicated by the arrows at this point in Fig. 2 to an opening 38 in the plate 28 which defines the inflow end of the compartment 11. The equivalent structure shown in Fig. 3 is provided by intake conduit or pipe 39 to the exchanger 31 and a second connecting conduit or pipe 40 from the exchanger 31 to the inflow end 17 of the compartment 11 of the system.

Means such as a pump 41 is shown in Fig. 3 to depict a fluid circulator for the system. Where the system is to be airborne, the fluid employed may be air which is obtained from the atmosphere surrounding the craft. The temperature of the entrant air is dependent of the altitude of the craft and the atmosphere conditions at such altitude. Also, the circulating means may be provided by the movement of the craft. It will be understood that the system with such a fluid is closed through the atmosphere. Where the medium employed is a cooling fluid other than air, the system may be closed through a sump (not shown) that receives exhaust fluid from the outflow ends 23 and 24 of the compartments 12 and 13 by way of the respective conduits or pipes 42 and 43. Inflow to the system is from the sump by way of conduit or pipe 39. The location and capacity of the sump should also be such as to assure that the fluid or air supplied by the system to the inflow end of the compartment 11 be of a temperature that is lower than the temperature within the compartment 11 where the illustrative heat radiating electrical components 16 are located. The outflow ends of the compartments 12 and 13 shown in Figs. 1 and 2 are provided by the respective openings 44 and 45 in the cover 15. The heat exchanger of the combination is located between the upstream and downstream connections to the compartment 11 so as to preheat the entrant fluid in accordance with the heat supplied thereto from the fluid downstream of the compartment 11. The system accordingly utilizes the heat of the heat radiating electrical components 16 to preheat the entrant fluid. The heat exchanger 31 also functions to cool the fluid entering the inflow end of the second compartment of the unit as constituted by one or more of the compartments 29, 13 and 29, 12.

Particularly, where the system is airborne and the entrant fluid may be at a temperature very considerably below the range in which the electronic components cooled by the system should operate, the system further includes suitable heating means for the fluid or air as indicated at 46. As shown, the heater 46 is located in the compartment 11 between the inflow and outflow ends thereof. Further, the heater shown is an electrical type that is controlled by a thermostat 47 also located in the compartment 11 in accordance with the temperature of the fluid or air therein to cut in at a predetermnied low point and cut off at a predetermined high point. The heat provided in the compartment 11 by the heating means 46 supplements the heat radiated from the electrical tubes 16 so that the heat provided the exchanger 31 is sufficient to heat the entering fluid to prevent the electrical tubes 16 from operating under temperature conditions below that for which the same were designed. Primarily, the heater 46 is only operative under conditions where the atmospheric temperature is very low. Under usually encountered conditions when the amplifiers have become warmed sufficient heat is obtained from the tubes 16 effective through the exchanger 31 to thermostatically cut off the heater 46. In operation, the exchanger and supplemental heater of the system cooperate to maintain the temperature of the fluid circulating in the area of the heat radiating bodies 16 within limits predetermined by the thermostat 47. The system is so designed that with the compartments 12 and 13 included, the exchanger 31 is also such as to cool the entrant air or fluid for these compartments to maintain the temperature of the fluid circulating in the respective compartments of the closed receptacle in the areas of the respective heat radiating elements therein within predetermined limits.

As a packaged assembly, as shown in Figs. 1 and 2, the system contains the heating radiating electrical components 16, 19 and 20, the heater 46 and thermostat 47, the upstream and downstream connections and the heat exchanger 31 between the connections. The described system in packaged form is an electromechanical component of a navigation system that requires accurate temperature control in order to maintain uniform operating characteristics.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A fluid circulation cooling system for maintaining the temperature of heat radiating, electrical components within a predetermined range of operation including a chassis with heat radiating, electrical components mounted thereon having wall plates compartmenting the components and providing a fluid inflow passageway, a cover fitting the chassis providing a closed assembly therewith having a first compartment with a fluid inflow end connected to the passageway, and a fluid outflow end, a second compartment having a fluid inflow end, and a fluid outflow end, a heat exchanger within the assembly connecting the outflow end of the first compartment to the inflow end of the second compartment located in the inflow passageway of the chassis, means for supplementing the heat exchanger to maintain the temperature of the cooling fluid in the system within a predetermined range including a heater located in the first compartment of the assembly to prevent the temperature of the fluid from going below a predetermined low point and thermostatic means for controlling the operation of the heater in accordance with the temperature of the fluid in the first compartment to cut in at the low temperature point and cut off at a predetermined high temperature point, and means for circulating the fluid through the passageway, compartments and heat exchanger of the assembly to preheat the circulating fluid at the inflow passageway in accordance with the temperature of the fluid in the first compartment and to cool the circulating fluid at the inflow end of the second compartment.

2. In an air circulation cooling system for maintaining the temperature of heat radiating, electrical components within a predetermined range of operation, a chassis with heat radiating, electrical components mounted thereon having wall plates compartmenting the components and providing an inflow passageway to the atmosphere, a cover fitting the chassis providing an assembly therewith having a first compartment with an inflow end connected to the passageway, and an outflow end, a second compartment having an inflow end, and an end exhausting to the atmosphere, a heat exchanger within the assembly between the outflow end of the first compartment and the inflow end of the second compartment located in the inflow passageway of the chassis to preheat the circulating air of the system at the inflow passageway in accordance with the temperature of the air in the first compartment and to cool the circulating air at the inflow end of the second compartment, and means for supplementing the heat exchanger to maintain the temperature of the circulating air of the system within a predetermined range including a heater located in the first compartment of the assembly to prevent the temperature of the air from going below a predetermined low point and thermostatic means for controlling the operation of the heater in accordance with the temperature of the air in the first comparment to cut in at the low temperature point and cut off at a predetermined high temperature point.

References Cited in the file of this patent

UNITED STATES PATENTS

| 1,941,339 | Currier | Dec. 26, 1933 |
| 2,187,011 | Braden | Jan. 16, 1940 |
| 2,394,060 | Holmes | Feb. 5, 1946 |
| 2,766,968 | Blizard | Oct. 16, 1956 |

FOREIGN PATENTS

| 321,802 | Great Britain | Nov. 21, 1929 |